July 21, 1925.
J. G. BATT
1,546,559
APPARATUS FOR STUDYING THE PROPERTIES OF AEROFOILS
Filed April 12, 1924    2 Sheets-Sheet 1
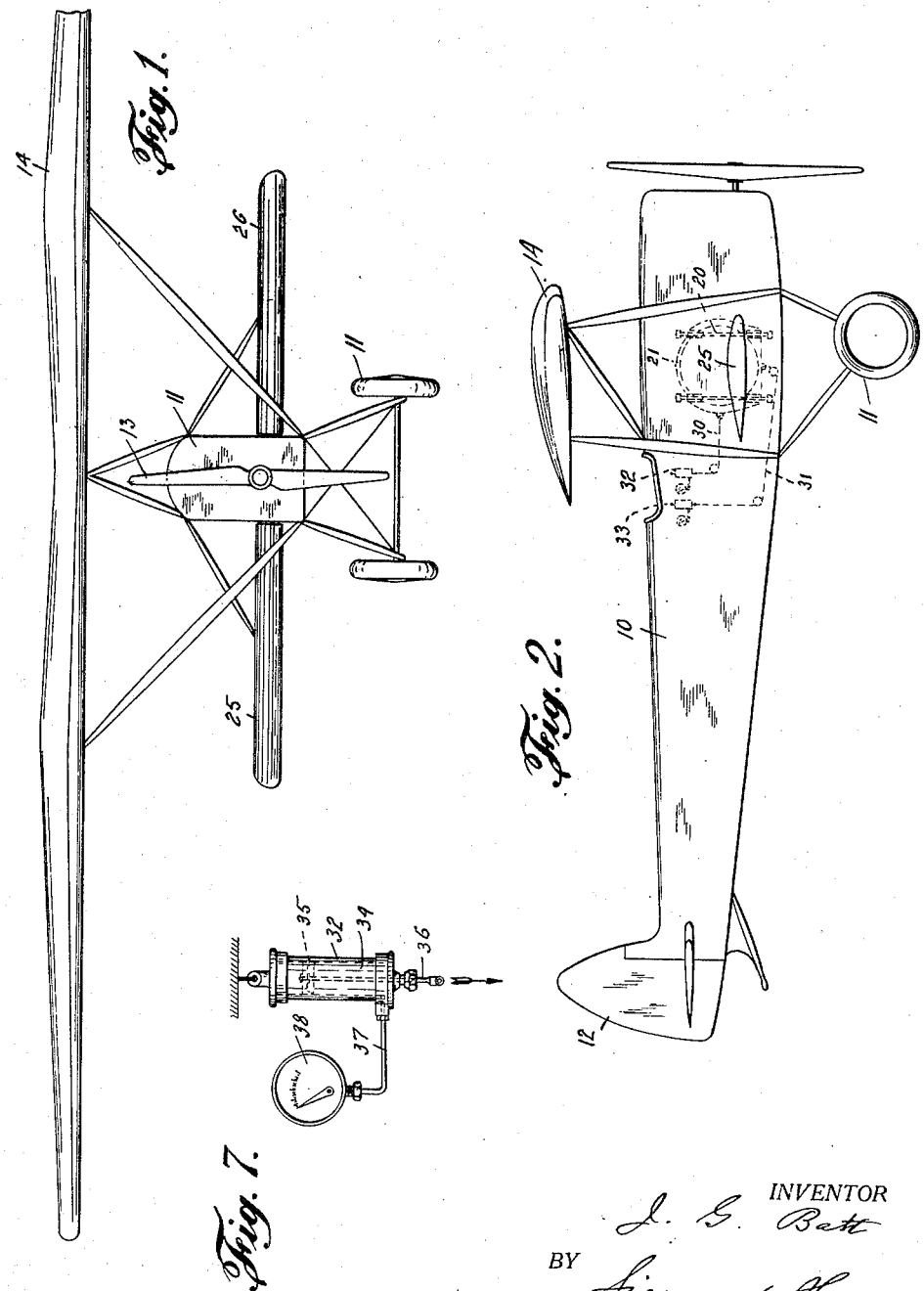

July 21, 1925.
J. G. BATT
1,546,559
APPARATUS FOR STUDYING THE PROPERTIES OF AEROFOILS
Filed April 12, 1924  2 Sheets-Sheet 2
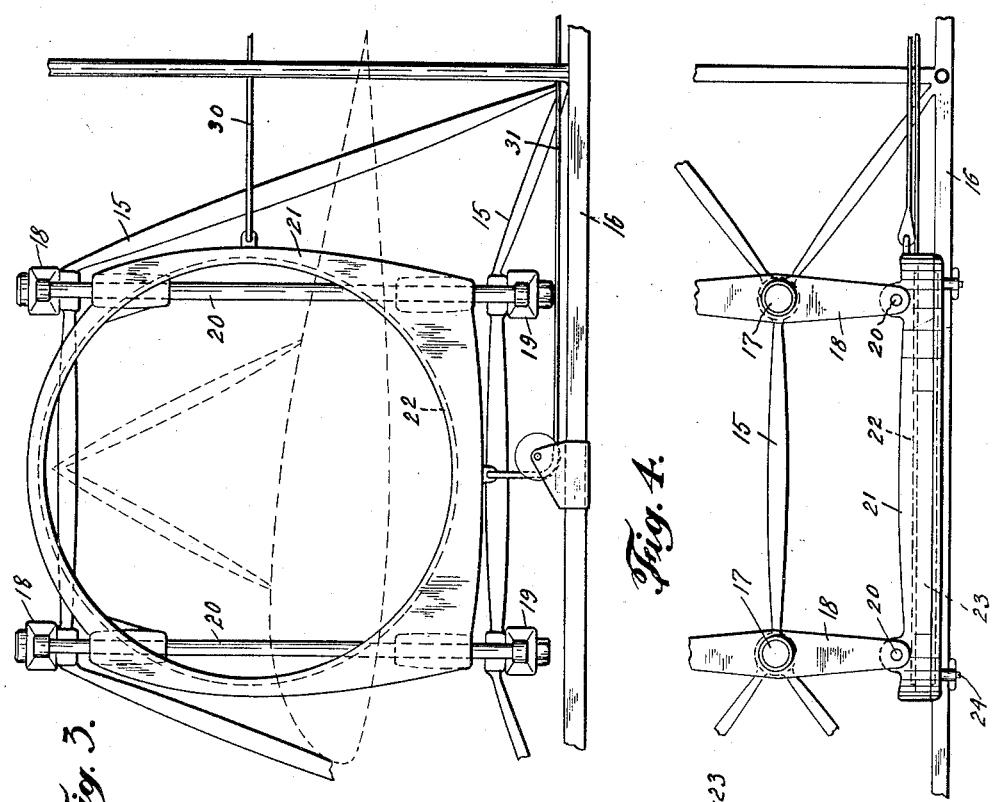
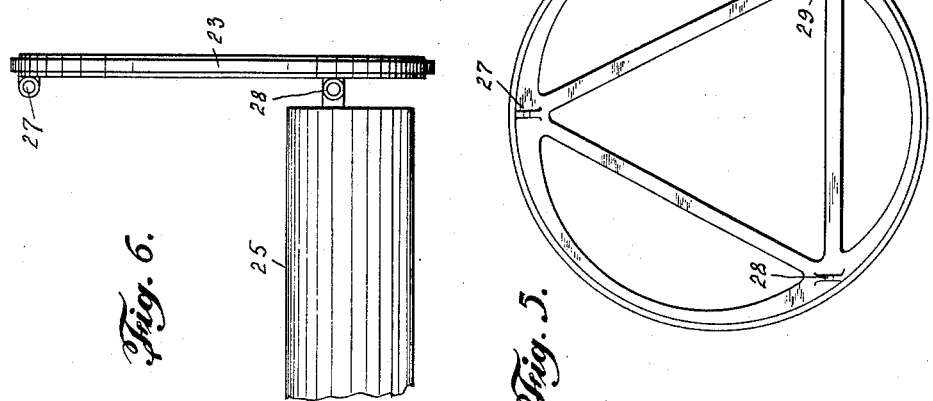
INVENTOR
J. G. Batt
BY
ATTORNEY Patented July 21, 1925.

1,546,559

UNITED STATES PATENT OFFICE.

JACOB G. BATT, OF NEW YORK, N. Y.

APPARATUS FOR STUDYING THE PROPERTIES OF AEROFOILS.

Application filed April 12, 1924. Serial No. 706,072.

*To all whom it may concern:*

Be it known that I, JACOB G. BATT, a citizen of the Swiss Federal Republic, and resident of the city of New York, in the county of New York and State of New York, have invented certain new and useful Improvements in an Apparatus for Studying the Properties of Aerofoils, of which the following is a specification.

The present invention relates to an apparatus for studying the properties of the wings or aerofoils of aeroplanes.

Heretofore tests of this type have been conducted in laboratories, in which tests either the aeroplane is stationary and a current of air directed against the same, or the aeroplane is mounted upon a support that is propelled on rails. It is obvious that the results of these tests are not accurate and, while they greatly aid in the construction of aeroplanes, they do not give exact figures, as the tests are not carried out under actual flight conditions.

The main object of the present invention is to provide a resting apparatus, which is adapted to be mounted upon an aeroplane, thereby enabling the tests on aeroplanes to be made in free flight.

Another object of the present invention is to so construct the apparatus that the test aerofoils may be conveniently mounted thereon and removed therefrom in very short time.

A further object of the invention is to so construct the apparatus that the aerofoils may be readily adjusted thereon, more particularly their angle of inclination relative to the air movement.

A further object of the invention is to so construct the apparatus that the lift and drift of the aerofoils may be tested simultaneously, but the data obtained by independent registering devices.

With these and other objects in view, which will more fully appear as the nature of the invention is better understood, the same consists in the combination, arrangement and construction of parts hereinafter described, pointed out in the appended claims and illustrated in the accompanying drawings, it being understood that many changes may be made in the size and proportion of the several parts and details of construction within the scope of the appended claims, without departing from the spirit or sacrificing any of the advantages of the invention.

One of the many possible embodiments of the invention is illustrated in the accompanying drawings, in which:—

Figure 1 is a front elevation of an aeroplane provided with a testing apparatus constructed in accordance with the present invention; Fig. 2 is a side elevation thereof; Fig. 3 is a side elevation of the testing apparatus, on a larger scale; Fig. 4 is a plan view of the same; Fig. 5 is a side elevation of a frame on which the aerofoil to be tested is mounted; Fig. 6 is a top plan view of the said frame with an aerofoil thereon; and Fig. 7 is a front elevation of one of the registering devices of the apparatus.

In the drawings an aeroplane is illustrated, including a fuselage or body 10, preferably, in the form of a stream-line housing, containing a power plant, fuel tanks, seats for the observers, etc., all of which have not been shown as they do not form part of the present invention. This body is provided with a running gear 11, as usual in constructions of this type, and has mounted thereon a plurality of rudders 12 for the well known purpose. The propeller of the aeroplane is indicated by the numeral 13. On top of the body are mounted aerofoils or wings 14, which may be of any suitable construction.

Within the fuselage is mounted a frame 15, preferably attached to longitudinal members 16 of the fuselage and carrying in the longitudinal center line of the said fuselage two vertical bars 17. On the upper end of each of these bars is oscillatably mounted a transversely extending lever 18, and to the lower end of each bar is oscillatably fixed a transversely extending lever 19. The bars extend through these levers centrally, as clearly shown in Fig. 4 of the drawings. Each lever 18 is connected with the lever 19 below the same by two vertically extending rods 20. On the rods 20 on each side of the longitudinal axis of the fuselage is shiftably mounted a frame 21, the two frames extending vertically in parallel relation to the longitudinal axis of the fuselage. Each of these frames is substantially ring-shaped and is provided in its inner face with an annular groove 22, in which is shiftably mounted an annular frame member 23. The position of this annular frame member in relation to the frame 21 may be fixed by means of clamping screws 24, or otherwise. To each annular frame member 23 is fixed an aerofoil, denoted by the numerals 25 and 26. These aerofoils are disposed below the aerofoils 14, one on each side of the fuselage. The aerofoils 25 and 26 are fixed to the respective annular frame members 23 on a plurality of points, denoted in the drawings by the numerals 27, 28 and 29, so as to move with the said annular frame member as the position of the latter is adjusted in relation to the frame 21. The connecting means between the aerofoils 25 and 26 and the frame members 23 extend through the sides of the fuselage.

To each frame 21 are connected two cables 30 and 31. Each cable 30 is connected with a gage 32, and each cable 31 with a gage 33. In other words, there are four gages associated with the two frames 21. These gages may be of any suitable construction, they embodying each in the case illustrated in the drawings a closed cylinder 34, in which is mounted a piston 35, the rod 36 of which is connected with one of the cables mentioned. Each cylinder communicates through a pipe 37 with a pressure gage 38 of any suitable construction. Each cylinder is filled with a suitable liquid, for the well known purpose.

The operation of this device is as follows: On one of the annular frame members 23 is mounted an aerofoil, the properties of which as to lift and drift are well known to the operator. On the other one of the frames 23, on the other hand, is mounted an aerofoil, the properties of which are to be tested. A free flight is then made with the aeroplane. It is obvious that that of the aerofoils 25 and 26 which offers more resistance to the air will lag or fall behind, and, as the same is connected by the intermediary of the levers 18 and 19 with the other aerofoil, the latter will be advanced. The relative positions of these two aerofoils will obviously be observable on the two gages 32, which are connected through the cables 30 with the frame 21. In this manner obviously the drift of the aerofoil, the properties of which are to be studied, can be easily compared with the known drift of the other aerofoil.

Similarly can be observed the lift of the aerofoil, the properties of which are to be studied. It is obvious from the drawings that that of the aerofoils 25 and 26 which has a greater lift will be raised in relation to the fuselage 10, the frame 21, on which the said aerofoil is mounted, rising on the respective rods 20. The relative positions of the two aerofoils are observable on the gages 33, which are connected with the cables 31.

It is obvious that both the drift and lift of the aerofoils may be studied under various inclinations of the said aerofoils relative to a horizontal plane passing through the fuselage 10, both aerofoils 25 and 26 being adjustable in relation to the frames 21, as above described.

Considering the results of the experiments so made, the shapes, sizes and desired inclination of the aerofoils may be properly determined in relation to an aerofoil, the properties of which are known. Inasmuch as the tests are made in actual flight, the data obtained are absolutely reliable and may be used in designing aerofoils, in contradistinction to the experiments heretofore conducted in which coefficients had to be relied on, which were obtained by experiments carried out under conditions which differ from the actual practice.

It is obvious that, while herein the apparatus has been described for studying the properties of aerofoils, it may be used for testing the properties of other elements of the aeroplane just as well. It may be used, for instance, for testing the resistance of the fuselage, stays, braces, rudders, fins and other elements, without departing from the invention.

What I claim is:—

1. A testing device, comprising an aeroplane, a supporting frame thereon, two sets of guides on said frame on opposite sides of the longitudinal axis of the body of said aeroplane, a frame vertically slidable on each set of guides, said last-mentioned frames being adapted to move vertically independently of one another, connecting means between said two sets of guides movable on a vertical pivot on said supporting frame, said pivot being disposed in the longitudinal axis of said supporting frame whereby said two slidable frames are capable of moving in opposite directions substantially parallel to the longitudinal axis of the body of said aeroplane, and means for indicating the movements of said slidable frames.

2. A testing device, comprising an aeroplane, a supporting frame thereon, two sets of guides on said frame on opposite sides of the longitudinal axis of the body of said aeroplane, a frame vertically slidable on each set of guides, said last-mentioned frames being adapted to move vertically independently of one another, connecting means between said two sets of guides movable on a vertical pivot on said supporting frame, said pivot being disposed in the longitudinal axis of said supporting frame whereby said two slidable frames are capable of moving in opposite directions substantially parallel to the longitudinal axis of the body of said aeroplane, means for attaching an aerofoil to each of said slidable frames, and means for indicating the movements of said slidable frames.

3. A testing device, comprising an aeroplane, a supporting frame thereon, two sets of guides on said frame on opposite sides of the longitudinal axis of the body of said aeroplane, a frame vertically slidable on each set of guides, said last-mentioned frames being adapted to move vertically independently of one another, connecting means between said two sets of guides movable on a vertical pivot on said supporting frame, said pivot being disposed in the longitudinal axis of said supporting frame whereby said two slidable frames are capable of moving in opposite directions substantially parallel to the longitudinal axis of the body of said aeroplane, a second frame clamped to each of said slidable frames having an aerofoil mounted thereon, said clamped frames being adjustable on said slidable frames to permit the angle of inclination of said aerofoils to be varied, and means for indicating the movements of said slidable frames.

Signed at New York, in the county of New York, and State of New York, this 20th day of March, A. D. 1924.

JACOB G. BATT.